United States Patent [19]

Achtsnit et al.

[11] Patent Number: 4,719,318

[45] Date of Patent: Jan. 12, 1988

[54] INSULATED CONDUCTORS AND METHOD OF MAKING SAME

[75] Inventors: Hans D. Achtsnit, Elsenfeld; Hans U. Herwig, Erlenbach; Reinhold Kolb, Kleinwallstadt, all of Fed. Rep. of Germany

[73] Assignee: Akzo NV, Arnhem, Netherlands

[21] Appl. No.: 798,414

[22] Filed: Nov. 15, 1985

[30] Foreign Application Priority Data

Nov. 17, 1984 [DE] Fed. Rep. of Germany ....... 3442160
Oct. 3, 1985 [DE] Fed. Rep. of Germany ....... 3535267

[51] Int. Cl.$^4$ .................... H01B 7/18; C03C 25/06
[52] U.S. Cl. ................................ 174/102 R; 65/2; 65/3.3; 65/31; 174/110 A; 174/124 G
[58] Field of Search ............. 65/2, 3.3, 3.31, 3.15, 65/31; 428/387, 389, 391; 427/71, 123, 126.2; 174/110 R, 110 A, 102 R, 102 P, 124 G

[56] References Cited

U.S. PATENT DOCUMENTS

| | | | |
|---|---|---|---|
| 2,186,442 | 1/1940 | Youmans . | |
| 2,341,235 | 2/1944 | Palmer | 174/124 GX |
| 2,390,039 | 11/1945 | Slayter et al. | 174/121 |
| 2,495,630 | 1/1950 | Dorst | 174/110 A X |
| 3,540,203 | 11/1970 | Thoresen et al. | 174/110 A X |
| 4,332,600 | 6/1982 | Wegerhoff et al. | 65/2 |

FOREIGN PATENT DOCUMENTS

| | | |
|---|---|---|
| 0160232 | 11/1985 | European Pat. Off. . |
| 1103479 | 10/1961 | Fed. Rep. of Germany . |
| 2900991 | 7/1980 | Fed. Rep. of Germany . |
| 481021 | 12/1969 | Switzerland . |

OTHER PUBLICATIONS

The Manufacturing Tech. of Continuous Glass Fibers, 2nd Ed., Loewenstein, 1983, pp. 2, 34 and 35.
E. Mills, BICC Ltd., "Mineral Insulated Metal Sheathed Cables", Wire Industry, May 1976, pp. 409-413.
"Hormone bis Keramik", Ullmanns Encyklopadi der Technischen Chemie, 4, Neubearbeitete und Erweiterte Auflage, Band 13, Weinheim, New York, 1977, p. 367.

Primary Examiner—Robert L. Lindsay
Attorney, Agent, or Firm—Parkhurst & Oliff

[57] ABSTRACT

Mineral insulated conduits are produced by insulating one or several electrical conductors, preferably metallic conductors, with silica staple fibers and sheathing the entire conductor with a metallic jacket. The silica staple fibers are produced by treating dry-spun soda water glass fibers which are free of non-alkaline metal compounds and which have a molar ratio of $Na_2O:SiO_2$ of approximately 1:3 to 1:1.9, with aqueous, hydrogen ion containing acid or salt solutions, and then washing, drying, and optionally heat treating. Preferably, a binder is also used. The preferred binders are low in or free of alkalies, such as silica sol, boron trioxide, organosilanes, or the like. The mineral insulated conductors produced are characterized by a low electrical capacitance, low dielectric losses and a high electrical resistivity and are usable in a very wide range of temperatures. Instrument leads, thermocouples and heating conductors may also be produced in this advantageous manner.

23 Claims, No Drawings

INSULATED CONDUCTORS AND METHOD OF MAKING SAME

BACKGROUND OF THE INVENTION

The present invention relates to the use of silica staple fibers which are prepared from dry-spun soda water glass fibers by treating the dry-spun soda water glass fibers with acid and/or salt solutions which contain hydrogen ions, which are to be used in the production of mineral insulated conductors.

Mineral insulated conductors have existed for a long time. Mineral insulated conductors are defined to be conductors or cables containing one or more metallic conductors, preferably. For example, copper wires embedded in an inorganic mass prepared from an inorganic powder. The embedded conductors, including their inorganic insulation, are covered by a metallic envelope, the so-called sheathing.

Mineral insulated conductors of the type described above are discussed in an article by E. Mill entitled "Mineral Insulated Metal Sheathed Cables" in Wire Industry, May 1976, pages 409 to 413. The insulation of the metallic cores in the mineral insulated conductor by an inorganic powder has many disadvantages including high conductor capacitance. This essentially is due to the high dielectric constant of the powder insulation used.

DE P No. 103479 describes heating conductors surrounded by a metal sheathing, said conductors being electrically insulated from said sheathing by glass fibers. The above cited patent further discloses that glass fibers leached with hydrochloric acid may also be used, so that these fibers will primarily consist of pure silica.

Glass fibers, however, have inadequate insulating capability, while leached glass fibers are very brittle and are difficult to process.

This invention was developed in view of the foregoing background and to overcome the foregoing drawbacks.

SUMMARY OF THE INVENTION

It is accordingly an object of this invention to provide mineral insulated conductors which are produced in a simple and economical manner and have the lowest possible electrical capacitance, low dielectric losses and a high electrical resistivity.

This object is obtained by insulating an electrical conductor with a material consisting mainly of $SiO_2$ fibres, and sheathing this insulating material, with a metallic jacket. The $SiO_2$ fibers are produced by treating dry-spun soda water glass fibers, which are free of non-alkaline metal compounds and which have a molar ratio of $Na_2O:SiO_2$ between approximately 1:3 to approximately 1:1.9, with aqueous, acid or salt solutions which contain hydrogen ions. The fibres obtained are then washed and dried and preferably also heat treated.

For the production of the insulating body, a binder is preferably used in connection with, the $SiO_2$ fibers. In a preferred embodiment, the product is heat treated after drying.

DETAILED DESCRIPTION

The preparation of staple fibers which contain $SiO_2$, such as those used according to the invention, is effected preferably by a process such as that described in DE-OS No. 2900991. The disclosure in this published application is incorporated herein by reference. The staple length desired is preferably obtained by the process of wet grinding described in the above cited application.

The $SiO_2$ containing fibers may be exposed prior to processing to a subsequent heat treatment. The latter may be effected by a process such as that described in DE-OS No. 2 900 991.

Subsequent heat treatments may be carried out in a temperature range of 900° to 1100° C.

Fibers low in or free of alkalies may be obtained first by utilizing well known processes such as the process described in DE-OS No. 2900991, and then by leaching the fibers with acid or salt solutions and subsequently washing with particular care and intensity.

The $SiO_2$ containing staple fibers are further processed for use as mineral insulated conductors in one of the following manners.

A paste containing the fibers with the additional use of a binder can be extruded and suitable hollow bodies such as, for example, small tubes, may be formed. This simple tubular form is required, for example, for mineral insulated conductors containing a single core.

A further possibility of producing hollow bodies of this type includes, for example, introducing an aqueous dispersion of the fibers including an appropriate binder into a hollow cylindrical mold, allowing the fibers to settle, suctioning off the water preferably at the lower part of the mold and continuing to fill the mold with fibers by adding the dispersion and suctioning off the water, until a suitable hollow body is formed. The body is subsequently removed from the mold, dried and heat treated, for example, by annealing.

It is also possible to sheath the conductor directly, for example by coating or co-extrusion with the insulating sheathing. It is further possible to produce the small tubes or other shapes serving as insulation from solid bodies containing SiO2 staple fibers by stamping or drilling.

If several cores are to be present in the mineral insulated conductors, suitable insulating bodies can be prepared, for example, in the form of round rods, which contain a plurality of openings inside, i.e., continuous cavities in the axial direction, corresponding in number to the number of cores. Insulating bodies of this type may also be prepared in the aforedescribed manner.

Suitable binders which can be used in the fiber processing are, for example, silica sol, boron trioxide, possibly in combination with, for example, methylhydroxyethylcellulose and the like, and organic silicon substances, such as for example organosilanes, silicone resins, etc. These binders are available commercially in low alkali or alkali free formulations. The amount of binder used and the water content may be varied within wide limits. By the selection of the type and quantity of the binder and the adjustment of the water content, the properties of the insulating body, in particular its density (porosity), may be adjusted. Thus, densities of, for example, 0.2 to 0.8 $g/cm^3$ may be obtained without difficulty.

The intended conductors (cores) may be drawn into the insulating bodies, or the insulating bodies may be drawn over the conductors. In particular, in the case of long lines, it is advisable to combine several pieces to construct the insulating body i.e., to line up a plurality of shorter insulating body sections in succession on the conductor.

The $SiO_2$ fibers obtained through the process described above have an average length of approximately 50 to 2000 μm and a non-crystalline structure. The $SiO_2$ content of the fibers should be above 95% by weight and is preferably above 99% by weight. The $SiO_2$ fibers are low in (e.g. less than 0.1 weight percent of alkalies), and preferably free from, alkalies.

The molded body, consisting of the conducting cores and the inorganic insulation, is then surrounded by a metallic envelope, the so-called sheathing. This may be effected, for example, by the simple insertion of the mineral insulating body containing the conductor. Other modes of operation are possible.

The mineral insulated conductors may then be brought into the cross section required by conventional mechanical processing, for example, by deforming, drawing, extruding, or the like. It is obvious that depending on the material used, one or several intermediate heat treatments, for example, annealing treatments, may be used.

As the material for the core or cores, conventional conductors, such as carbon, metals or metal alloys, capable of conducting electric currents or electromagnetic waves, may be used. Especially suitable are materials which are stable at elevated temperatures, for example, stable up to 1000° C. Thus, cores constructed of copper, copper alloys, nickel, chromium/nickel alloys, platinum, tungsten, or the like, are suitable. The conducting core or cores may have different cross sections or designs, for example, round or rectangular cross sections. Metal conductors are preferred.

The sheathing material may also consist of copper or suitable alloys. For applications requiring resistance to very high temperatures, metals or alloys with high temperature strength may be used. The aforementioned metals or alloys, among others, may be used. In particular, high temperature stainless steels may be used as the sheathing material.

It is particularly surprising that according to this invention, it is possible to obtain mineral insulated conductors, with insulation characterized by low values of electrical capacitance and low values of dielectric loss, and by very high electrical resistivities. As the insulation is highly temperature resistant and may be exposed to temperatures of at least 1000° C., or even higher, the mineral insulated conductors may be used within a very wide temperature range.

Mineral insulated conductors of all conventional dimensions may be prepared by the process of this invention. Furthermore, mineral insulated conductors may be made with the precision required for high frequency technology. Thus, it is possible to arrange the conductors within the insulation well and at a uniform distance from the sheathing and possibly from each other. This invention makes is possible to produce insulation with constant properties over the entire length of the line. It is a particular advantage that the conductors may be used within a wide temperature range, without experiencing instability of electrical properties with increasing or decreasing temperature. This is presumably the result of the extensively amorphous or non-cyrstalline structure of the fibers used.

The cores, i.e., the conductors in the mineral insulated conductors, are not only well insulated from the sheathing, they are also insulated from each other, i.e., if two or more cores are present in the mineral insulated conductor, the the individual cores are well insulated from each other.

While the present invention has been described in its preferred embodiments, it is to be understood that the invention is not limited thereto, and may be otherwise embodied within the scope of the following claims.

What is claimed is:

1. A process for preparing mineral insulated conductors comprising:
   producing fibers which contain more than 95% $SiO_2$ by treating dry-spun soda water glass fibers with aqueous acid or salt solutions containing hydrogen ions, washing said fibers and drying said fibers, said $SiO_2$ fibers being free of non-alkaline metal compounds, said dry-spun soda water glass fibers having a molar ratio of $Na_2O:SiO_2$ of between approximately 1:3 to approximately 1:1.9; and
   insulating at least one conductor with said $SiO_2$ fibers and sheathing said at least one insulated conductor with a metallic jacket.

2. The process according to claim 1, wherein said fibers are heat treated after said drying.

3. The process according to claim 1, wherein a binder low in alkalies is used to join said fibers.

4. A mineral insulated conductor comprising a conducting core, an insulating material surrounding said conducting core, and a metallic jacket sheathing surrounding said insulating material, said insulating material comprising fibers containing $SiO_2$ in an amount greater than 99% by weight, said insulating material further including a binder which joins said fibers, said $SiO_2$ fibers being free of alkalies and having an average length of approximately 50 to 2000 μm and a non-crystalline structure.

5. The process according to claim 4, wherein the $SiO_2$containing fibers have an $SiO_2$ content of more than 98% by weight.

6. The process according to claim 5, wherein the $SiO_2$containing fibers have an $SiO_2$ content of more than 99% by weight.

7. The process according to claim 6, wherein the $SiO_2$fibers are low in alkalies.

8. The process according to claim 7, wherein a binder low in alkalies is used to join said fibers.

9. The process according to claim 8, wherein the $SiO_2$fibers have an average length of approximately 50 to 2000μm.

10. The process according to claim 9, wherein the $SiO_2$fibers have a non-crystalline structure.

11. The process according to claim 8, wherein the mineral insulated conductor prepared comprises an instrument lead.

12. The process according to claim 8, wherein the mineral insulated conductor prepared comprises a thermal couple.

13. The process according to claim 8, wherein the mineral insulated conductor prepared comprises a heating conductor.

14. A mineral insulated conductor comprising a conductor, an insulation material, and a sheathing, said insulation material comprising a plurality of $SiO_2$ fibers, said $SiO_2$ fibers having a $SiO_2$ content of greater than 95% by weight and said $SiO_2$ fibers being produced by treating dry-spun water glass fibers with aqueous acid or salt solutions which contain hydrogen, washing said $SiO_2$ fibers and drying said $SiO_2$ fibers, said $SiO_2$ fibers being free of non-alkaline metal compounds, said dry-spun water glass fibers having a molar ratio of $Na_2O:SiO_2$ of between approximately 1:3 to approximately 1:1.9.

15. The mineral insulated conductor according to claim 14, wherein the SiO$_2$ content is greater than 98% by weight.

16. The mineral insulated conductor according to claim 15, wherein the SiO$_2$ content of the fibers is greater than 99% by weight.

17. The mineral insulated conductor of claim 16, wherein the SiO$_2$ containing fibers are low in alkalies.

18. The mineral insulated conductor of claim 17, wherein the SiO$_2$ fibers are free of alkalies.

19. The mineral insulated conductor of claim 14, wherein the insulating material further comprises a binder, said binder being low in alkalies.

20. The mineral insulated conductor of claim 14, wherein the SiO$_2$ containing fibers have an average length of approximately 50 to 2000 μm.

21. The mineral insulated conductor according to claim 14, wherein the SiO$_2$ fibers have a non-crystalline structure.

22. The mineral insulated conductor of claim 14, wherein the sheathing comprises a metallic jacket.

23. The mineral insulated conductor of claim 14, wherein the fibers are heat treated after said drying.

* * * * *

UNITED STATES PATENT AND TRADEMARK OFFICE
CERTIFICATE OF CORRECTION

PATENT NO. : 4,719,318
DATED : January 12, 1988
INVENTOR(S) : ACHTSNIT et al

It is certified that error appears in the above-identified patent and that said Letters Patent is hereby corrected as shown below:

Column 1, line 59, change "SiO2" to --$SiO_2$--.

Column 2, line 38, change "SiO2" to --$SiO_2$--.

Column 3, line 67, delete "the" (first occurrence).

Signed and Sealed this

Ninth Day of August, 1988

Attest:

DONALD J. QUIGG

Attesting Officer

Commissioner of Patents and Trademarks